R. T. JOHNSTON.
MECHANICAL MOVEMENT.
APPLICATION FILED MAY 17, 1900. RENEWED AUG. 25, 1905.

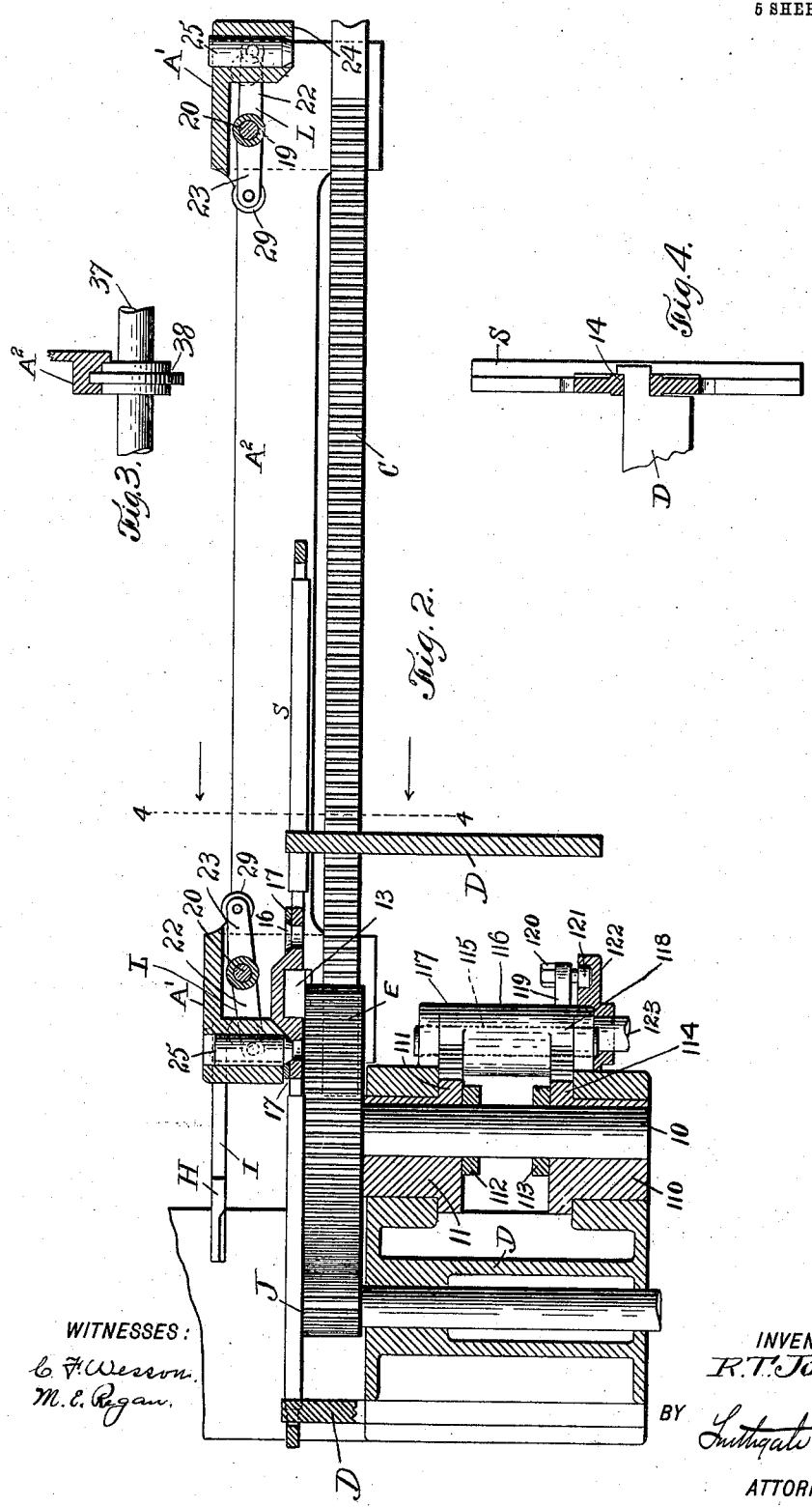

No. 893,245.　　　　　　　　　　PATENTED JULY 14, 1908.
R. T. JOHNSTON.
MECHANICAL MOVEMENT.
APPLICATION FILED MAY 17, 1900. RENEWED AUG. 25, 1905.
5 SHEETS—SHEET 3.
Fig. 5.
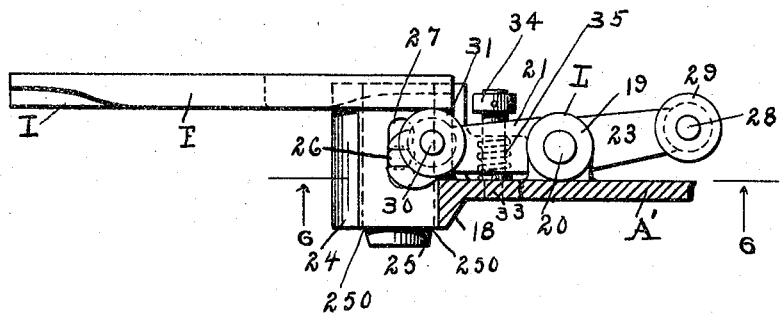
Fig. 6.
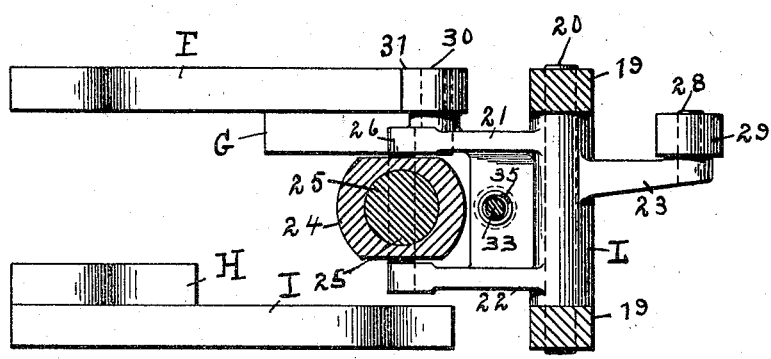
Fig. 7.
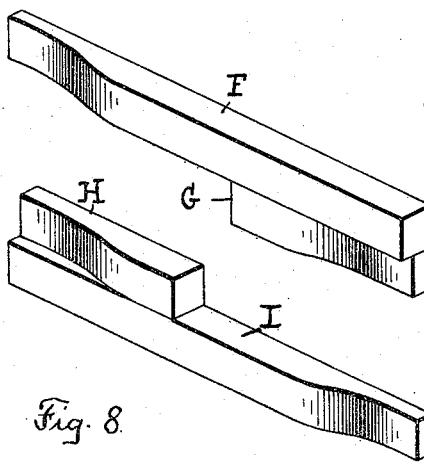
Fig. 8.
Witnesses.
W. J. Baldwin.
M. E. Regan.
Inventor.
R. T. Johnston
By Southgate & Southgate
Attorneys.

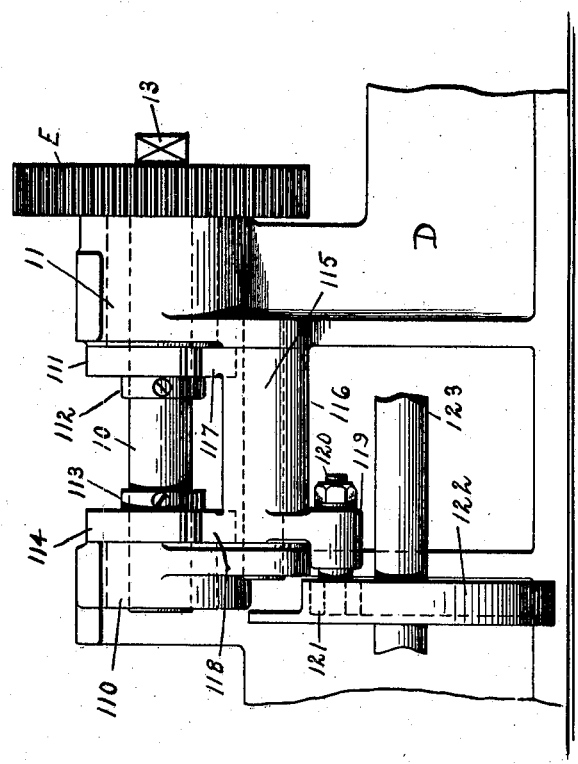
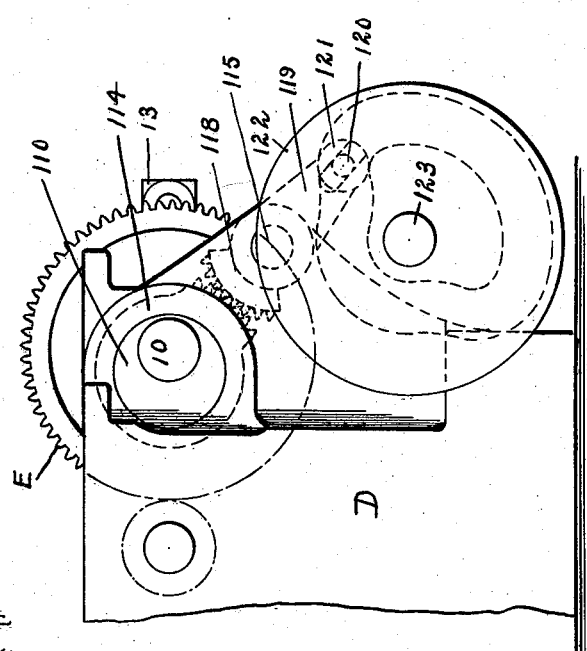

UNITED STATES PATENT OFFICE.

ROBERT T. JOHNSTON, OF PLAINFIELD, NEW JERSEY, ASSIGNOR TO CAMPBELL PRINTING PRESS & MANUFACTURING COMPANY, OF NEW YORK, N. Y., A CORPORATION OF NEW YORK.

MECHANICAL MOVEMENT.

No. 893,245.  Specification of Letters Patent.  Patented July 14, 1908.

Application filed May 17, 1900, Serial No. 16,973. Renewed August 25, 1905. Serial No. 275,846.

*To all whom it may concern:*

Be it known that I, ROBERT T. JOHNSTON, a citizen of the United States, residing at Plainfield, in the county of Union and State of New Jersey, have invented a new and useful Mechanical Movement, of which the following is a specification.

The aim of this invention is to produce a new and improved mechanical movement for converting or changing rotary motion into reciprocating motion, which movement may be advantageously employed in reciprocating the beds of printing machines.

The especial object of the invention is to improve the mechanism shown, described and claimed in Patent No. 570,597, granted to Winfield S. Huson, Nov. 3, 1896.

Figure 1:
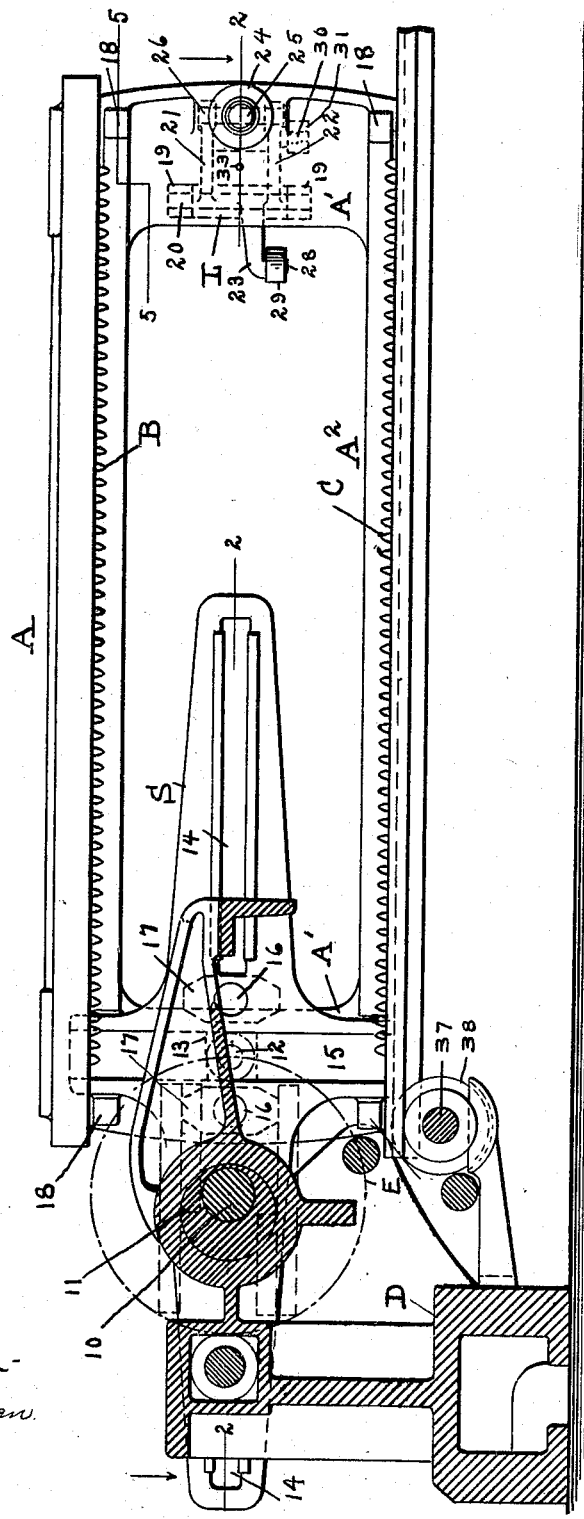

Referring to the accompanying five sheets of drawings forming part of this application for patent, Figure 1 is a side view partly in section, illustrating the arrangement of the parts; Fig. 2 is a plan view taken on the line 2—2 of Fig. 1; Fig. 3 is a detail view of a supporting roll for the lower part of the bed; Fig. 4 is a detail sectional view taken on line 4—4 of Fig. 2 illustrating the mounting of the reciprocating slider; Fig. 5 is an enlarged plan view, and Fig. 6 an enlarged elevation partly in section taken on the line 6—6 of Fig. 5, showing the details of one of the locking-pin actuating mechanisms carried by the bed; Figs. 7 and 8 are perspective views illustrating the cams used to actuate the locking-pins; Fig. 9 is a side elevation, and Fig. 10 an end elevation, showing the mounting of the main driving gear, and Figs. 11 to 16 inclusive are diagrammatic views illustrating the operation of the parts.

In the said patent granted to Winfield S. Huson, a mechanical movement is shown, which consists of a main driving mechanism formed by a continuously revolving gear, which alternately engages an upper and lower rack attached to the bed, to impart the main forward and backward movement. A reversing mechanism is also used which consists of a reciprocating slider or yoke, which is actuated by a wrist-pin mounted on the face of the main driving gear. This reciprocating slider comes against abutments on the bed at the end of the main reciprocating movement in either direction, and is locked to the bed by means of latches, so that a crank motion reverse will be imparted to the bed. This mechanism is arranged to reverse the bed at both ends of its movement. The main driving gear of this mechanism is raised and lowered by having its shaft mounted eccentrically in a bushing, which is oscillated by connections from a cam. I have improved upon this mechanism in the following way. Instead of employing latches to connect the reciprocating slider and bed during the reversing periods, I employ axially sliding locking-pins or bolts, which are actuated by suitable rockers from stationary cams. By this arrangement a very strong, simple and efficient locking mechanism is provided which will not wear, and which will act very accurately and quickly. I have also improved the arrangement of the mounting of the main driving gear by journaling the same in two eccentric bushings, and providing connecting actuating mechanism, so that said two bushings will operate together to raise and lower the main driving gear. By this arrangement if the parts should become stuck or clogged in operation the same can be readily taken apart for the purpose of refitting or lubrication.

Referring to the drawings and in detail, A designates the reciprocating bed or member, which is mounted so as to be capable of a right line movement upon a suitable frame in any of the manners common in printing press machinery, not necessary to herein describe at length. Extending down from each end of the bed are brackets A'—A', which are connected together at their lower ends by a piece or frame A².

B designates the upper rack, and C the lower rack, which are secured to the bed in the same vertical plane.

D designates the framing of the machine in which the driving gear and pinion are arranged.

E designates the driving gear, which is disposed between the two racks B and C, the diameter of said driving gear being slightly less than the distance between said two racks, so that when said gear engages one rack it will just clear the other.

J designates a pinion which is mounted on a suitable shaft to which power is imparted. This pinion J meshes with and turns the main driving gear E.

The main driving gear is secured on the end of a shaft 10 which is journaled eccentrically in two bushings 11 and 110, which are fitted in bearings in the framing D. The bushing 11 has a collar 111 thereon, which collar has gear teeth cut in a portion of its surface. The bushing 110 has a similar collar 114. Collars 112 and 113 are secured on the shaft 10 to keep the bushings 11 and 110 in place in their bearings. A shaft 115 is journaled in the framing D below the shaft 10. On this shaft 115 is fitted a quill 116 which has extending arms 117—118, on which are cut or formed gear teeth to engage the gear teeth cut on the collars 111 and 114 of the bushings. The quill 116 has an extending arm 119 which carries a stud 120, provided with a roller 121 which engages the groove of a cam 122 secured on shaft 123. This shaft is driven by any suitable gearing, and in the device shown, is arranged to make one turn for every complete cycle or forward and backward reciprocation of the bed. By this arrangement, the main driving gear E will be properly raised and lowered to alternately mesh with the racks B and C. By this arrangement the shaft 10 will be strongly and rigidly journaled, and also the bushings can be readily got at and adjusted or fitted by loosening the collars 112 and 113 and sliding the same along the shaft 10.

Referring now to the details of the reversing mechanism, 12 designates a wrist-pin which is fitted on the gear E on the pitch line thereof, as shown and described in said patent to Huson. Fitted on said wrist-pin is a block 13 which engages a groove 15 cut in a slider S. This slider S is provided with suitable grooves 14 which have bearing faces, which are fitted on bearings or supports projecting from the framing D, as shown in Fig. 4, whereby said slider will have a crank actuated reciprocating motion at all times. Holes 16—16 are bored in said slider at each side of the groove 15, as shown in Figs. 1 and 2. Surrounding said holes are steel faces 17. Suitable stops 18—18 are formed on the brackets A' of the bed to come against the slider. Projecting from each of said brackets A' are bearings 19—19, in each set of which is journaled a shaft 20. On each shaft 20 a rocker L is arranged.

The rockers at the ends of the bed are rights and lefts, and the one at the left hand end of the bed will be particularly described. The same is illustrated in Figs. 5 and 6. The same has projecting from one side thereof two arms 21 and 22, and projecting from the other side an arm 23. A bearing 24 is formed on each bracket A', and fitted to slide axially in each of said bearings is a locking-pin or bolt 25. The end of each of said locking-pins is tapered. These locking-pins are adapted to engage the holes 16—16 formed in the slider. The taper on the ends of the bolts insures a very quick and easy locking action, the taper being of such angle as to prevent any sticking. By having the locking pins or bolts slide axially to engage the slider a very accurate and reliable locking mechanism is provided which has the advantage that substantially no strain comes upon the operating means for said bolts while they are in engagement. To prevent the bolts from entering too far into the holes, the tapered portion at the ends thereof is cut slightly down below the full diameter of the bolts, so as to leave a slight shoulder 250 which limits the movement of the locking-bolts into the holes 16. The faces 17 are made removable and out of steel, so that they can be easily replaced in case of wear. The two arms 21 and 22 are forked at their outer ends, as shown, and engage a pin 26 which passes through the locking-pin 25, which pin 26 projects through slots 27 formed in the bearing 24. In the arm 23 a stud 28 is secured, which carries a roller 29. A stud 30 is secured in the arm 21, and the same carries a roll 31. A bolt or stud 33 is fitted into the bracket A', and the same is provided with a suitable nut or collar 34. A spring 35 is arranged thereon between the bracket A' and a web extending between the arms 21 and 22, whereby the movement of said rocker will be limited, and whereby the same will be normally moved to keep the bolt 25 in retracted position. Stationary cams F and G are secured to the framing D, the cam F being in the horizontal plane of the roller 31, and the cam G in the horizontal plane of the roller 29. The rocker at the right hand end of the bed is substantially the same as the rocker previously described at the left hand end, except that it is oppositely arranged thereto, so that the two rockers are relatively rights and lefts. The arm 23 of the right hand rocker has the roller 29 on the lower side thereof, and the roller 31 is disposed on the arm 22 instead of the arm 21. Another stationary cam H is arranged in the same horizontal plane with the roller 29 of the right hand rocker, and another cam I in the same horizontal plane with the roller 31 of said right hand rocker. By this arrangement as hereinafter described, the bolts 25—25 will be properly actuated to engage the slider.

A shaft 37 is arranged below the bed, and is provided with a roller 38 which engages a groove on the lower part of the bed, as shown in Fig. 3, to steady the bed in operation.

Figure 11:
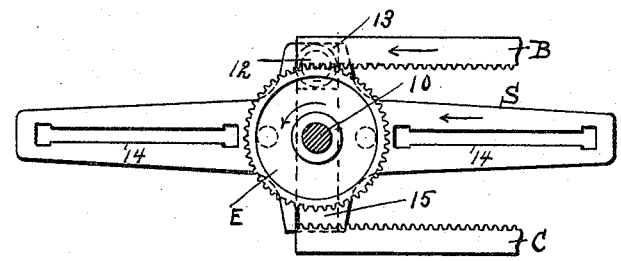
Figure 12:
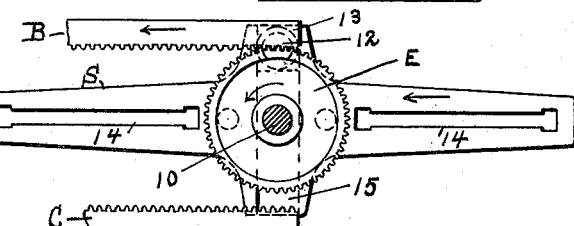
Figure 13:
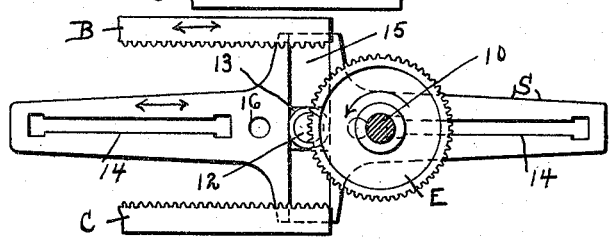
Figure 14:
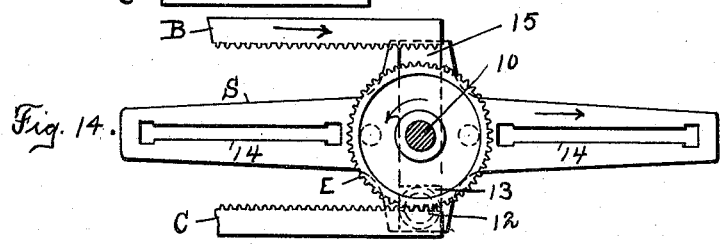
Figure 15:
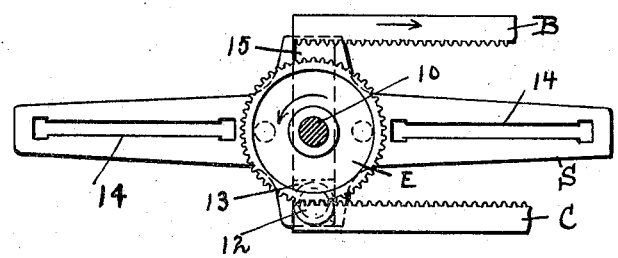
Figure 16:
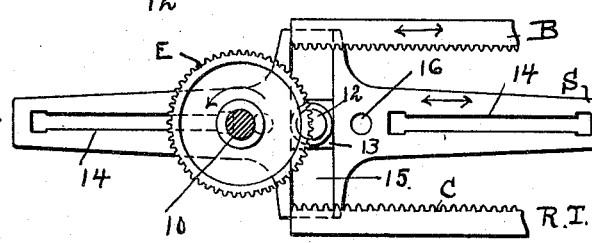

The operation can be readily followed from the fifth sheet of the drawings. In the particular device shown and described, the pinion is arranged to constitute what is termed a three-revolution pinion. That is, it will make three revolutions for each complete reciprocation of the bed. In Fig. 11 the bed is just commencing its main stroke to the left, the gear E engaging the rack B. In Fig. 12 the main stroke to the left is just completed, the main driving gear having made a complete revolution from the position shown in Fig. 11, and just leaving the rack B. In this position the slider comes against the stops 18 on the right hand end of the bed, and the roller 31 on the right hand rocker has just run up the cam I to push the right hand bolt 25 out into the right hand hole 16 on the slider, whereby the slider and the bed are locked together. The slider will then gradually retard and bring the bed to a state of rest at the left hand extreme, this action taking a quarter revolution of the gear, and bringing the parts to the position shown in Fig. 13. Then during the next quarter revolution the slider will gradually start the bed from zero up to full speed, and bring the parts to the position shown in Fig. 14. During this last half revolution of the gear E, the eccentric bushings will have acted to lower said gear E, so that the same will now engage the lower rack C. Just as the parts assume this position, the roller 29 on the right hand rocker will run up the cam H, and this motion will cause the right hand bolt 25 to withdraw and release the bed from the slider. During the next turn of the gear E the bed will receive its main movement to the right at full speed, which will bring the parts to the position shown in Fig. 15. As the parts assume this position, the stops 18 on the left hand side of the bed will come against the slider S, and the roller 31 on the left hand rocker will have run up the cam F, thereby inserting the left hand locking-bolt 25 into the left hand hole 16 in the slider. During the next quarter revolution of the main driving gear, the slider will act to reverse the bed, or bring the same to a state of rest, as shown in Fig. 16. During the next quarter revolution of the driving gear E, the bed will be started up from zero to full speed, and the parts brought to the position shown in Fig. 11. During this last half turn of the driving gear E, the same will have been raised by the eccentric bushings to engage the upper rack B. Just as the parts assume this position, the roller 29 on the left hand rocker will have engaged the cam G, and the left hand locking-bolt will have been withdrawn from the slider, thus disconnecting the slider from the bed. The previously described movements will give the complete forward and backward reciprocation to the bed, and the same will take three revolutions of the driving gear. This relative proportion and arrangement, of course, can be varied and proportioned, as desired.

It will be seen that the locking mechanism described forms a very strong and efficient quick acting device for instantly and positively connecting and disconnecting the slider and bed at the proper times.

The details and arrangements herein shown and described may be varied without departing from the scope of my invention as expressed in the claims.

Having thus fully described my invention what I claim and desire to secure by Letters Patent is:—

1. The combination in a mechanical movement of the frame, a bed arranged to reciprocate thereon, a main driving mechanism for the bed, and a reversing mechanism comprising a slider carried by the frame, and an axially moving locking pin or bolt for connecting the bed and slider for a reversing movement.

2. The combination in a mechanical movement of the frame, a bed arranged to reciprocate thereon, a main driving mechanism for the bed, and a reversing mechanism comprising a slider carried by the frame, and axially moving locking pins or bolts for connecting the bed and slider during the reversing movements.

3. The combination in a mechanical movement, of the frame, a bed arranged to reciprocate thereon, a main driving mechanism for the bed, and a reversing mechanism comprising a slider carried by the frame, axially moving bolts or pins, and cams for actuating the bolts to connect the bed and slider during the reversing movements.

4. The combination in a mechanical movement, of the frame, a bed arranged to reciprocate thereon, a main driving mechanism for the bed, and a reversing mechanism comprising a slider carried by the frame, axially sliding bolts fitted in bearings carried by the bed, means controlling said bolts, and cams for actuating said means to cause the bolts to connect the bed and slider during the reversing movements.

5. The combination in a mechanical movement, of the bed, the main driving mechanism therefor, and a reversing mechanism comprising a reciprocating slider, axially moving locking-bolts carried by the bed, rockers for actuating the bolts, and stationary cams F, G, H and I for actuating the rockers.

6. The combination in a mechanical movement, of the bed, the main driving mechanism therefor, and a reversing mechanism comprising a reciprocating slider, locking-bolts for connecting the bed and slider during the reversing movements, means for actuating the bolts, and springs for normally holding said bolts in retracted positions.

7. The combination in a mechanical movement, of the bed, the main driving mechanism therefor, and a reversing mechanism comprising a reciprocating slider having holes, wearing plates protecting said holes, axially moving locking-bolts carried by the bed, and means for actuating said bolts to connect the bed and slider during the reversing movements.

8. The combination in a mechanical movement, of the frame, a bed arranged to reciprocate thereon, a main driving mechanism for the bed, and a reversing mechanism comprising a slider carried by the frame, right and left rockers carried by the bed, axially moving bolts actuated by said rockers, and means for moving said rockers so that said bolts will lock the slider and bed during the reversing movements.

9. The combination in a mechanical movement, of the frame, a bed arranged to reciprocate thereon, a main driving mechanism for the bed, and a reversing mechanism comprising a slider mounted to reciprocate on the frame, axially moving locking bolts or pins having tapered ends, tapered holes in the bed for receiving said pins, and means for operating said pins to connect the bed and slider for the reversing movements.

10. The combination in a mechanical movement, of the bed, the main driving mechanism therefor, and a reversing mechanism comprising a reciprocating slider, and locking-bolts having tapered ends, and shoulders between the tapered ends and the body of the bolts, for locking the bed and slider together during the reversing movements.

11. The combination in a mechanical movement, of the bed, the main driving mechanism therefor, a reciprocating slider provided with slots 14—14 fitted on bearings, and means for connecting the slider and bed during the reversing movements.

12. In the main driving mechanism of a mechanical movement, the main driving gear, the shaft on which the same is mounted, two bushings in which said shaft is eccentrically journaled, and connected actuating mechanism for simultaneously oscillating said bushings to raise and lower said gear.

13. In the main driving mechanism of a mechanical movement, the main driving gear, the shaft on which the same is mounted, two bushings in which said shaft is eccentrically journaled, gear-teeth formed on each of said bushings, a quill having segments engaging said gear-teeth, and means for oscillating said quill.

14. In the main driving mechanism of a mechanical movement, the main driving gear, the shaft therefor, two oppositely faced bushings in which said shaft is eccentrically journaled, collars for holding said bushings in their bearings, and means for oscillating said bushings.

15. In the main driving mechanism of a mechanical movement, the main driving gear, the shaft on which the same is mounted, two oppositely disposed bushings in which said shaft is eccentrically journaled, collars on the ends of said bushings, a quill having two segments engaging teeth formed on said collars, a cam, and connections therefrom to oscillate said quill.

In testimony whereof I have hereunto set my hand, in the presence of two subscribing witnesses.

ROBERT T. JOHNSTON.

Witnesses:
    CHAS. W. SPRAGUE, Jr.,
    J. WM. TESKE.